(12) United States Patent
Gill et al.

(10) Patent No.: US 7,633,701 B2
(45) Date of Patent: Dec. 15, 2009

(54) METHOD AND SYSTEM FOR INCREASING RECORDING FORMAT RELIABILITY FOR LIMITED MEDIA SPACE IN A TAPE DRIVE SYSTEM

(75) Inventors: Richard A. Gill, Arvada, CO (US); James Wolf, Tucson, AZ (US); Randy Allen Fout, Lyons, CO (US); Roger D. Hayes, Denver, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 550 days.

(21) Appl. No.: 11/454,497

(22) Filed: Jun. 16, 2006

(65) Prior Publication Data

US 2007/0294461 A1     Dec. 20, 2007

(51) Int. Cl.
*G11B 15/18* (2006.01)
(52) U.S. Cl. .............................. 360/72.1; 360/48; 711/4
(58) Field of Classification Search ........................ None
See application file for complete search history.

(56) References Cited

U.S. PATENT DOCUMENTS

| 5,793,552 | A | 8/1998 | Howell |
|---|---|---|---|
| 6,124,993 | A | 9/2000 | Hallamasek |
| 6,301,067 | B1 | 10/2001 | Takayama |
| 6,366,418 | B1 | 4/2002 | McEwen et al. |
| 6,898,036 | B2 | 5/2005 | Gill et al. |
| 7,224,545 | B2 | 5/2007 | Saliba et al. |
| 2001/0046099 | A1* | 11/2001 | Hamai et al. .................. 360/48 |
| 2004/0260861 | A1* | 12/2004 | Serizawa et al. ............... 711/4 |
| 2007/0043773 | A1* | 2/2007 | Tsuji .......................... 707/200 |

FOREIGN PATENT DOCUMENTS

| JP | 61222069 A | * | 10/1986 |
|---|---|---|---|
| JP | 09035418 A | * | 2/1997 |

* cited by examiner

*Primary Examiner*—Jason C Olson
(74) *Attorney, Agent, or Firm*—Dorsey & Whitney LLP

(57) ABSTRACT

A method for increasing recording format reliability in a tape drive system is disclosed. In one embodiment, the method includes identifying a default media information region (MIR) on a media, wherein the default MIR includes MIR information divided into segments, reading the MIR information, rotating the MIR information into a first rotation MIR information by rotating the segments by one segment; and writing the first rotation MIR information into a first MIR on the media. Other embodiments are also disclosed.

15 Claims, 8 Drawing Sheets

FIG. 5

| | Physical Wrap | Logical Wrap | Comments | |
|---|---|---|---|---|
| 508 — | 0 | 22 | Not used | |
| 510 — | 1 | 20 | Not used | |
| 512 — | 2 | 18 | Not used | |
| 513 — | 3 | 16 | Not used | |
| 516 — | 4 | 14 | Not used | |
| 526 — | 5 | 12 | MIR 3 | — 540 |
| 518 — | 6 | 10 | Not used | |
| 528 — | 7 | 8 | MIR 2 | — 538 |
| 520 — | 8 | 6 | Not used | |
| 530 — | 9 | 4 | MIR 1 | — 536 |
| 522 — | 10 | 2 | Not used | |
| 532 — | 11 | 0 | MIR (default) 0 | — 534 |
| 524 — | 12-23 | 1,3, ... 23 | Not used for MIR | |

US 7,633,701 B2

METHOD AND SYSTEM FOR INCREASING RECORDING FORMAT RELIABILITY FOR LIMITED MEDIA SPACE IN A TAPE DRIVE SYSTEM

FIELD

An embodiment of the invention relates to tape recording, and more specifically, to increasing recording format reliability in a tape drive system.

BACKGROUND

Presently, magnetic tapes are used for storage, backup, archiving, and subsequent retrieval of data. In data recording, often a dedicated region or area is located on the tape where special information (e.g., such as information about customers, data, and the tape itself, etc.) is kept. This region or area is widely known as media information region (MIR). A MIR is designed to be small and fixed so as to not take away from the total recording capacity of the tape and is typically set in front or at the earliest detection point of the tape, since it may contain coordinate information for data locating customer data. MIR being fixed in size limits the scope of error recovery options that are afforded to customer data at the expense of overall media capacity.

Furthermore, the special information about customer recorded data is essential for the efficient use of tape by a host and for the integrity of the data. It is generally known that the point on tape first located on a load operation is the preferred place for this data to be placed since it is generally needed before processing customer data and thus, it is necessary to keep this recording short so as to not take the capacity away from the customer recording area. However, keeping the recording short and in a predictable location makes it a recording reliability target. Conventional approaches do not provide for mitigating errors when placing new data on the tape in the midst of old/existing data some of which is bad old data. In other words, conventional approaches do not provide for discriminating between good existing data and bad existing data while new data is placed.

SUMMARY

According to one embodiment, a method for increasing recording format reliability in a tape drive system is disclosed. The method includes identifying a default media information region (MIR) on a media, wherein the default MIR includes MIR information divided into segments, reading the MIR information, rotating the MIR information into a first rotation MIR information by rotating the segments by one segment; and writing the first rotation MIR information into a first MIR on the media.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one

FIG. 5 illustrates an embodiment of wrapping of media information region.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Figure 1:
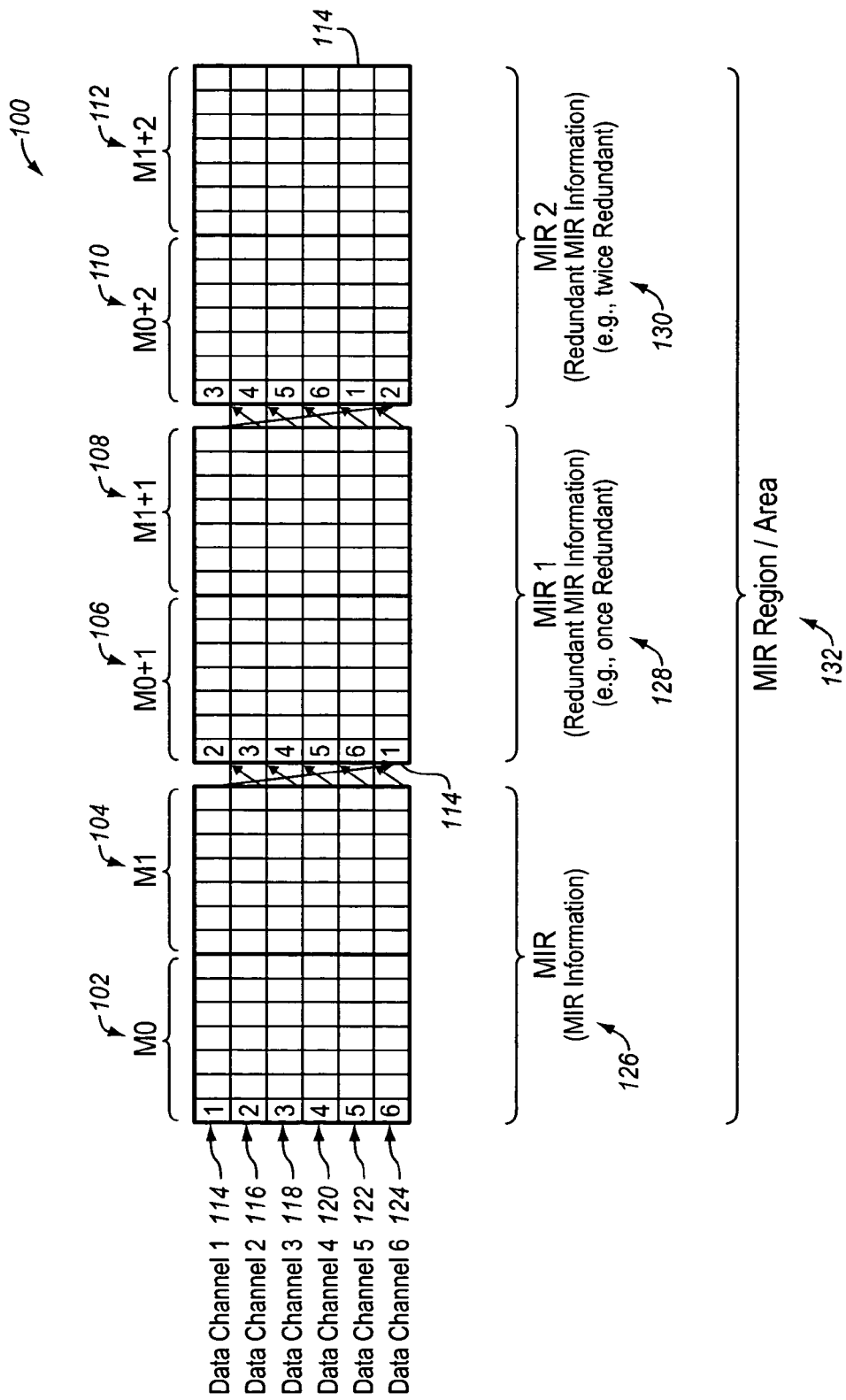
FIG. 1 illustrates an embodiment of a mechanism for providing media information region data redundancy.

FIG. 1 illustrates an embodiment of a mechanism 100 for providing media information region data redundancy. In one embodiment, data including in MIR information at MIR 0 126 is redundantly provided to increase recording format reliability for limited media space. In the illustrated embodiment, a media (e.g., magnetic tape) includes a number of matrices, such as M0 102, M1 104, M0+1 106, M1+1 108, M0+2 110, and M1+2 112. These matrices 102-112 further include blocks to store data. For example, each matrix 102-112 may include approximately 1024 blocks with each block having approximately 512 bytes of data. The data here may include metadata and error correction coding (ECC) data. The tape further includes a MIR 126 which includes a region to hold the MIR information relating to the data. For example, MIR 126 may contain data that is used to provide media and customer information, such as metadata, serial numbers, tables, data defects, relevant dates, etc. This data can be important to retrieve the data that is written on the rest of the tape. This is one reason the MIR information needs to be reliable when retrieved from tape.

In one embodiment, the reliability of the MIR information is achieved by redundantly writing the MIR information in a manner to provide maximum redundancy within the MIR area 132 such that the original data from MIR 126 can be retrieved from many smaller fragments, if necessary or desired. For example, reliability is achieved by writing multiple whole copies 128, 130 of MIR 126 down the tape. Each MIR 126, 128, 130 is divided into channel groups, such as data channels 114-124, so as to perform an additional channel rotation for not only MIR 126, but also for each whole MIR copy 128, 130 that is written. Also, for example, to achieve uniform redundancy, the minimum number of MIR copies 128, 130 is greater than or equal to the number of data channels 114-124 being used to record. This can generate an entire copy of each set of matrices 102-112 in each data channel 114-124. In one embodiment, there are 32 data channels; however, for clarity and brevity, merely 6 data channels 1-6 114-124 are illustrated here. Furthermore, when writing or reading there may merely be one MIR collectively generated from two or more MIR copies. Stated differently, it is not necessarily the count of each written MIR in place as it is the count of each MIR processed from the written or read MIRs. For example, given matrices 102, 104, 106 and 108 and given the missing data in matrices 104 and 106, this may be counted as one MIR written or read due to matrices 102 and 106 being recovered.

In the illustrated embodiment, as indicated by the arrows, the data from MIR information at MIR 126 (which expands over the first two matrices 102, 104) is redundantly written into corresponding matrices 106-112, such as the first redundant MIR information is located at MIR1 128 (at matrices 106, 108) and the second redundant MIR information is located at MIR2 130 (at matrices 110, 112) and so on and so forth. For example, data channel 1 114 from MIR 126 is the last segment at MIR1, while it is the second to last segment at MIR2 130, which, in one embodiment, is how MIR information is protected over various segments. Also, this technique is performed taking advantage of the MIR region 132, which includes several matrices but remains unused for the most part since the default or original MIR 126 includes about two matrices 102, 104. For brevity and clarity, only a limited number of matrices 102-112 and data channels or segments 114-124 are illustrated, but it is contemplated that the mechanism 100 may contain any number and/or combination of matrices and data channels, etc.

In the illustrated embodiment, MIR information is spread within MIR 126 that consists of two matrices M0 102 and M1 104. However, the MIR region 132 available for MIR information is much larger than the original MIR 126 at matrices 102, 104. To achieve reliability of MIR information, maximum redundancy is achieved by repeating the MIR information contained within MIR 126 matrices 102, 104 data channel 114-124 by data channel 114-124 (as indicated by arrows) and one after another throughout the entire available MIR region 132. Stated differently, as the MIR matrices 102, 104 are re-written, the vertical data channels 114-124 are rotated such that the original MIR 126 and each MIR copy 128, 130 has its data written into a different channel on the tape.

When MIR information at MIR 126 is written, a count of the number of MIR copies 128, 130 that can be completely read back and verified is kept. For the original MIR 126 to be written successfully, this count of complete MIR matrices 106-112 is used to determine the quality of the MIR write operation. This is further described with reference to FIGS. 3A and 3B.

When the MIR region 132 is read to retrieve the MIR information the entire MIR region 132 is processed. As full MIR matrices 106-112 are read, they are counted so that the quality of the MIR that was just read can be identified. The main difference with the read MIR operations is that the MIR matrix data for, for example, matrix M0 102 is written and saved into a single matrix location, such as M0+1 106, where good blocks in a channel overwrite each other. The same is done for matrix M1 104. This technique allows for a single complete MIR where the data for each read matrix can contribute to the final MIR data. Once the entire MIR region 132 has been read, the final saved matrices, such as M0 102 and M1 104, are fully checked for any remaining errors. The count of complete MIR matrices 126-130 processed is an indicator of the quality of the MIR region 132. In one embodiment, a MIR redundancy and rotating module (redundancy module) is employed to redundantly and rotatingly provide the MIR information at MIR 126 at matrices, such as matrices 106-112, at redundant MIRs, such as MIR1 128 and MIR2 130. Furthermore, a MIR data analyzer (data analyzer) may be employed to analyze the relevant MIR data.

Figure 2:
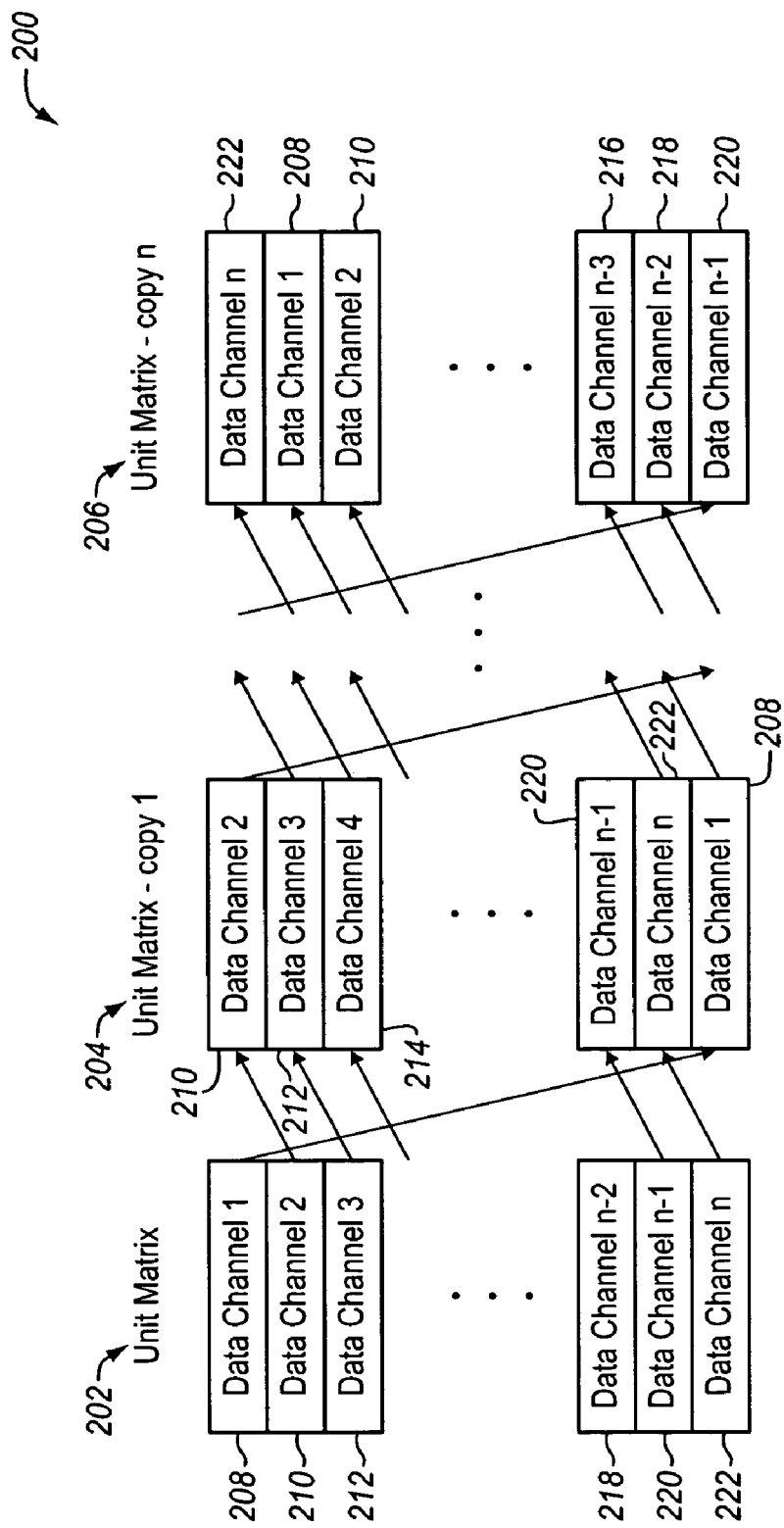
FIG. 2 illustrates an embodiment of a mechanism for providing media information region data redundancy.

FIG. 2 illustrates an embodiment of a mechanism 200 for providing media information region data redundancy. In one embodiment, MIR information at MIR at unit matrix 202 is redundantly copied segment by segment such that the MIR information is placed at other matrices 204, 206 within the available MIR region or area. In the illustrated embodiment, MIR information at various data channels 1-n 208-222 at matrix 202 is incrementally redundantly copied, data channel by data channel, at matrix 204 such that each data channel 208-222 is rotated. This process is continued until the data at matrix 202 is completely rotated, data channel by data channel, reaching matrix 206 in the MIR region. For example, MIR information at data channel 1 208 at matrix 208 is in the last piece of information at matrix 204, while data channel 2 210 is the first segment of information at matrix 204. Similarly, data channel n 222 is the first segment of MIR information at matrix n 206, while data channel 1 208 has fully completed its rotation to the second segment at matrix 206, which is one shy of its original location at matrix 202.

In one embodiment, this technique (such as the mechanisms of FIGS. 1 and 2) provides for redundant and rotating recording of MIR data within the MIR region on tape such that to avoid additional time with error recovery actions that result in stopping, and timely repositioning of the tape for subsequent recording trials. The technique also provides for recovering of previously recorded data of MIR information, while increasing the marginal media. In one embodiment, accumulating redundant error correction codeword systems are provided in a common repository and measured with a sufficient number of symbols are attained to successfully correct data, thus retrieving original data from the original MIR at matrix 202. Further, the MIR information from the original MIR at matrix 202 is recorded in a fixed allocated media space (e.g., MIR region of the tape) with sufficient accumulative ECC margin to retrieve data at a later time.

Figure 3A:
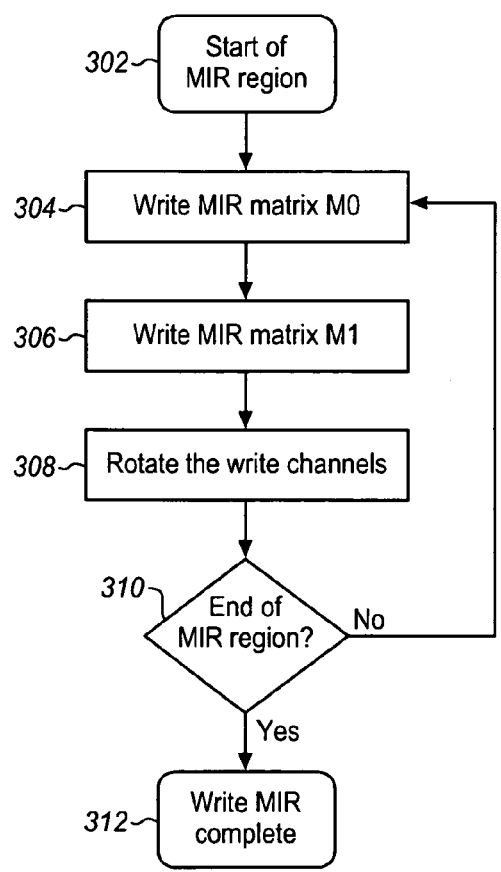
FIG. 3A illustrates an embodiment of a process for providing media information region data redundancy.

FIG. 3A illustrates an embodiment of a process for providing media information region data redundancy. In one embodiment, once MIR information from a MIR is written, a count of the number of copies of the MIR that are to be read back and verified is kept. For example, for a MIR to be written successfully, a count of completed MIR matrices is used to determine the quality of MIR write operations. In the illustrated embodiment, a write MIR process (blocks 302-312) and a read MIR verification process (blocks 314-324) are shown. Although the two processes are independent, the MIR read occurs while the write of the data occurs. Moreover, the number of MIR matrices written and the number of MIR matrices read and verified are compared to determine the write quality of the written MIR region.

At processing block 302, a MIR region is determined and started to be used for redundant copying of a MIR. In other words, the process or copying of MIR is started in the available MIR region. As described elsewhere, a MIR may occupy a couple matrices, while a MIR region may include plenty of available space that can be used to produce redundant MIR copies of the original MIR in accordance with one embodiment. At processing block 304, a first MIR matrix (e.g., matrix M0) is written. At processing block 306, a second MIR matrix (e.g., matrix M1) is written. The write channels or data channels of the MIR matrices are then rotated (as described with reference to FIGS. 1 and 2) at processing block 308. In one embodiment, the rotation includes redundantly copying the MIR information/data contained at the matrices of the original MIR such that the data channels (having the data) of the original MIR are continuously rotated—data channel by data channel—in making several copies of the original MIR. Whether the MIR region has ended is determined at decision block 310. If it has or the writing of MIR is completed, the writing of MIR is regarded as complete at processing block 312 and the process ends. The MIR information from data channels from the original MIR is to be written at rotated data channels at subsequent MIRs. If the MIR region or the process of writing has not yet ended, the process continues with processing block 304.

Figure 3B:
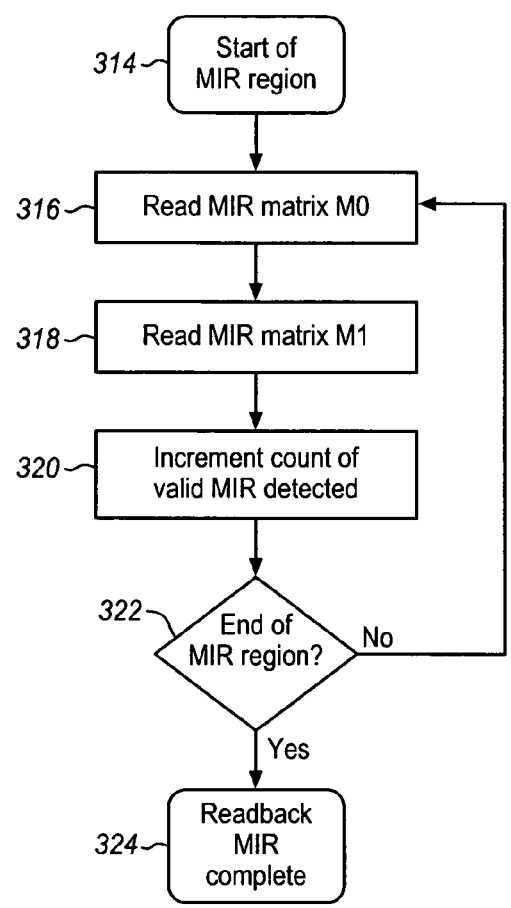
FIG. 3B illustrates an embodiment of a process for providing media information region data redundancy.

FIG. 3B illustrates an embodiment of a process for providing media information region data redundancy. At processing block 314, the process of MIR read verification starts with the available MIR region. The MIR information or data of a first MIR matrix (e.g., matrix M0) is read at processing block 316. Similarly, the MIR data from a second MIR matrix (e.g., matrix M1) is read at processing block 318. At processing block 320, an increment count of valid MIR matrices is detected. The count may then be used to determine the quality of completed MIR matrices. At decision block 322, whether the available MIR region or the process of reading has ended is determined. If the MIR region or the process of reading and verifying has not ended, the process continues at processing block 316. If the MIR region or the process has ended, the read back of MIR is regarded as complete. In one embodiment, the minimum number of MIRs read back while writing may have an accumulate distance greater than half the distance of the allocated MIR area. The technique is to prevent erroneously detecting another (old) MIR as the correct MIR. This minimum number may be increased to allow the reading of a minimum number of MIR copies, despite having some MIR copies becoming unreadable at times.

Figure 4:
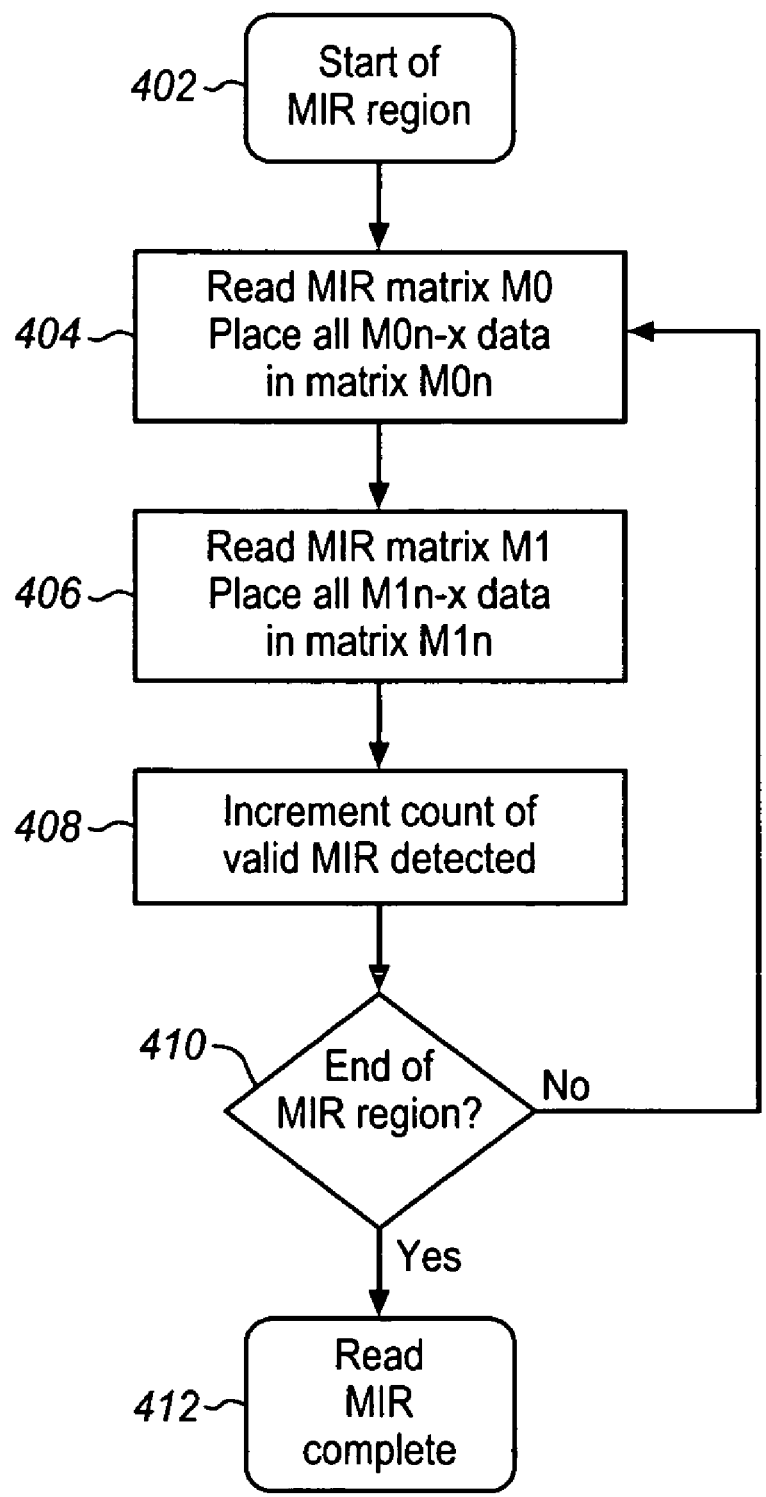
FIG. 4 illustrates an embodiment of a process for providing media information region data redundancy.

FIG. 4 illustrates an embodiment of a process for providing media information region data redundancy. In one embodiment, once a MIR region is read to retrieve the MIR information, the entire MIR region may be processed. As the MIR matrices are read, they are also counted so that the quality of the read MIR is identified. The MIR Matrix data for the first MIR matrix (e.g., matrix M0) is written and saved into one matrix location, where the good blocks in a channel overwrite each other. The same is then done for the second MIR matrix (e.g., matrix M1). One complete MIR is produced where all of the data for each read matrix can contribute to the final MIR data. Once the entire MIR region has been read, the final saved matrices, such as matrices M0 and M1, are fully checked for any remaining errors. The count of the complete MIR matrices processed serves as an indicator of the quality of the MIR region.

At processing block 402, the process starts with the start of a MIR region. At processing block 404, a first MIR matrix (e.g., matrix M0) is read and the data from the second to last matrix in the MIR region (e.g., matrix M0n-x) corresponding to the first MIR matrix, M0, is placed in the last matrix in the MIR region (e.g., matrix M0n) corresponding to the first MIR matrix, M0. At processing block 406, a second MIR matrix (e.g., matrix M1) is read and the data from the second to last matrix in the MIR region (e.g., matrix M1n-x) corresponding to the second MIR matrix, M1, is placed in the last matrix in the MIR region (e.g., matrix M1n) corresponding to the second MIR matrix, M1. An increment count of the valid MIR is detected at processing block 408. At decision block 410, whether the MIR region or the process has ended is determined. If not, the process continues with processing block 404. If it has, the process ends with read MIR being regarded as complete at processing block 412.

FIG. 5 illustrates an embodiment of recording redundant media information region data in adjacent wraps. In one embodiment, multiple recorded MIRs 536-540 of MIR 534 are provided in adjacent wraps 536-540 as a circular repository of MIR information or data. In the illustrated embodiment, twenty four recording wraps 508-524 of physical and logical nature 502, 504 are provided with twelve wraps in one order or way and twelve wraps in the other order or way on a media (e.g., magnetic tape). In one embodiment, the location of these wraps 508-524 as well as of the original MIR 534 and recorded MIR 536-540 may be provided on a memory chip or thorough an algorithm or module, as necessitated or desired. A tape format may record a number of data channels, such as 32 data channels in one embodiment. There may be multiple sets of 32 tracks such that the drive can concurrently record the 32 data channels at a time. Each set of 32 tracks may be referred to as a wrap 508-524 since the data written to the physical end of a tape is wrapped about or wrapped around to another set of tracks to recording in the opposite direction, which is an artifact of serpentine-type recording.

The opposite direction physical wraps and forward opportunity logical wraps 524 may not be used. These wraps 524 are regarded as reverse wraps. Physical wraps 502 refer to locations (e.g., 0, 1, 2 . . . 23) that are known to the hardware in terms of where to move up and down the tape. Logically, however, that is not necessarily the order of the tape as, logically, the tape may be written from the center and then spiral out as the edges of the tape are to be protected. In one embodiment, a default MIR 534 is provided at physical wrap 11 and logical wrap 0 532. The default MIR 534 is the original MIR that is present on the tape when it is first loaded. Since other statistics and data have been gathered and MIR 1 536 represents a MIR having not only the original MIR data from MIR 534, but also the additional data that has been gathered since.

In one embodiment, with regard to the MIR data history, MIR 1 536 represents a more current MIR compared to MIR 0 534 and is placed at physical wrap 9 and logical wrap 4 530. Similarly, MIR 2 538 and MIR 3 540 at physical wrap 7 and logical wrap 8 528 and physical wrap 5 and logical wrap 12 526, respectively, are even more current as they represent and contain further historical data, as well as the original MIR data from MIR 534 and any additional MIR data from previous MIRs. For example, MIR 3 540 includes MIR data from MIR 0 534 and additional MIR data from MIR 1 536 and MIR 2 538 and any other data gathered since MIR 2 538. In other words, MIR 3 540, in the illustrated embodiment, represents the most current MIR. If, for example, MIR 3 540, is damaged, MIR 2 538 can be accessed and used as having the most current MIR information and thus not all is lost. In one embodiment, a MIR recording module (recording module) is employed to record the MIR information or data into recorded MIRs 536-540, while a MIR data analyzer is employed to analyze the relevant data, including MIR data. It is contemplated that in this illustration, three recorded MIRs 536-540 are provided merely as an example and that any number of recorded MIRs may be produced at various locations on the tape, as necessitated or desired.

Figure 6:
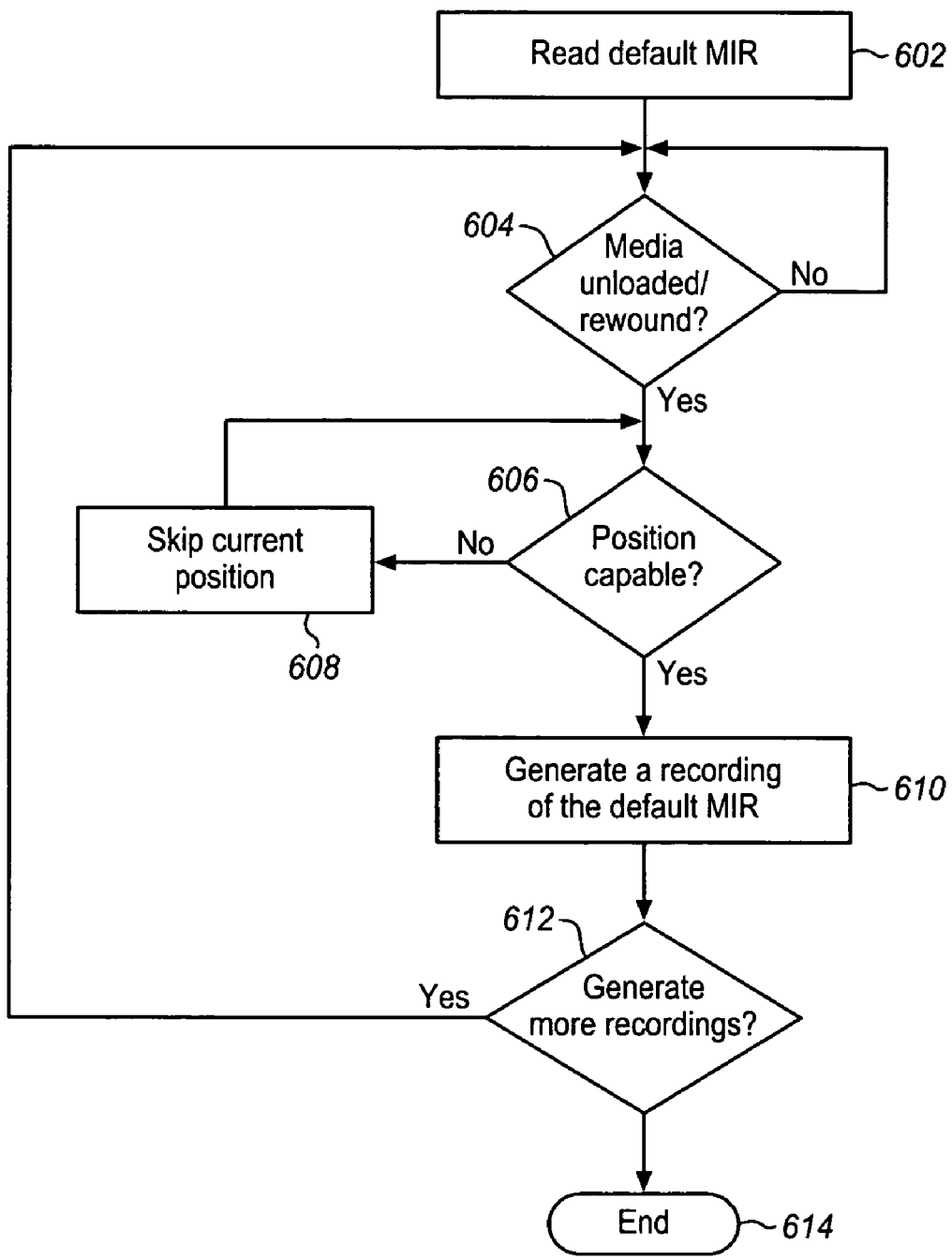
FIG. 6 illustrates a process for wrapping of media information region.

FIG. 6 illustrates a process for recording redundant media information region data in adjacent wraps. In one embodiment, a default MIR is read and analyzed at processing block 602. Such functions can be performed using a read detector or various read components as well as a MIR data analyzer. At decision block 604, whether the media (e.g., magnetic tape) is unloaded or rewound is determined. This is so that a next recording position is used each time the tape is unloaded or rewound. In one embodiment, the terms "unloaded" and "rewound" are used synonymously and generally refer to the media, such as a tape, being returned to its beginning position. If the tape is not unloaded, the process continues until the tape is unloaded. If the tape is unloaded, a determination is made as to whether the current position is capable of producing a MIR recording with sufficient margin at decision block 606, such as having multiple recorded MIR of the default or original MIR at various locations, such as adjacent wraps, on the tape. If the current position is determined to be incapable, the current position is skipped at processing block 608 and the process continues with decision block 606. If the position is capable of being used, a recorded MIR is generated at processing block 610. At decision block 612, a determination is made as to whether additional recorded MIRs are to be generated. If not, the process ends at termination block 614. If more recorded MIRs are to be generated, the process includes reading of the previous MIR and continues with decision block 604 to determine a proper time and position to generate the next recorded MIR. In one embodiment, recordings of redundant MIR data are provided in adjacent wraps.

Figure 7:
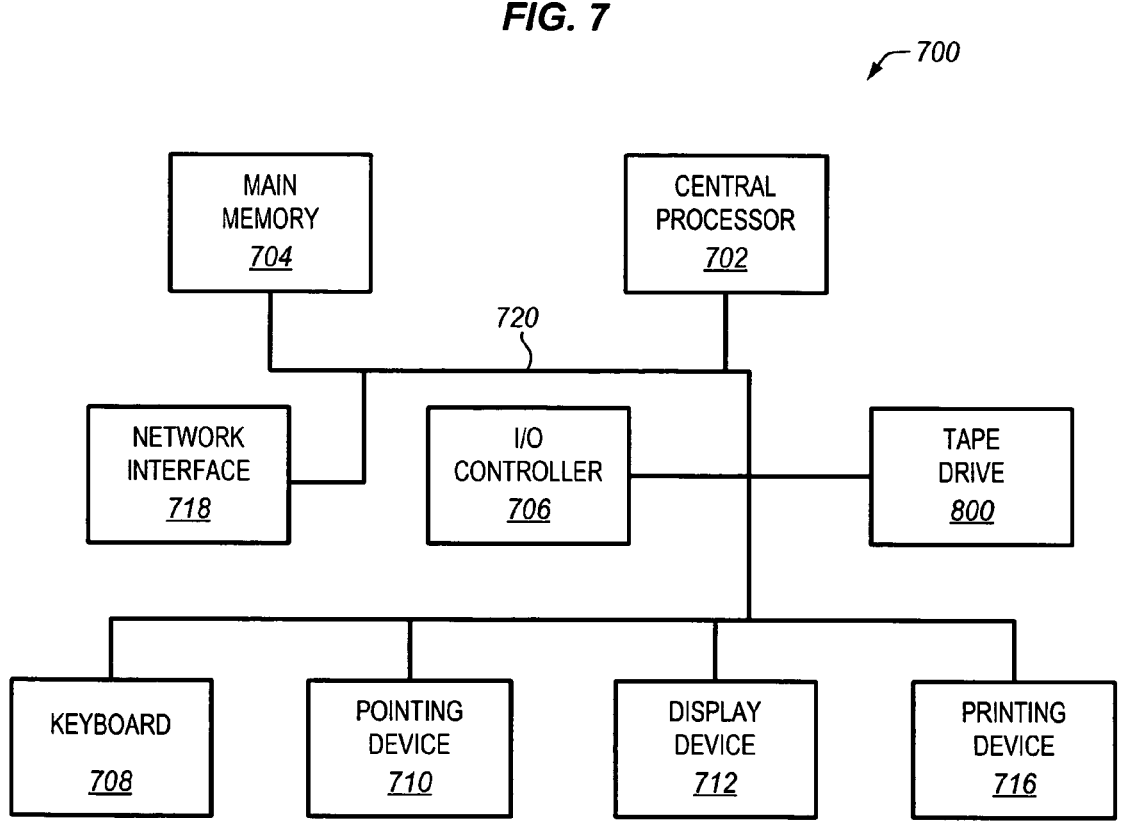
FIG. 7 illustrates an embodiment of a computer system.

FIG. 7 illustrates an embodiment of a computer system 700. Computer system 700 comprises a central processor 702, a main memory 704, an input/output (I/O) controller 706, a keyboard 708, a pointing device 710 (e.g., mouse, track ball, pen device, or the like), a display device 712, and a network interface 718. Additional input/output devices, such as a printing device 716, may be included in the system 700 as desired. As illustrated, the various components of the computer system 700 communicate through a system bus 720 or similar architecture.

In a further embodiment, computer system 700 may be a distributed computing system. In other words, one or more of the various components of the computer system 700 may be located in a physically separate location than the other components of the computer system 700. Such components may be accessed and connected via a network to the other components.

In one embodiment, computer system 700 includes a Sun Microsystems computer utilizing a Scalable Processor Architecture (SPARC) microprocessor available from several vendors (including Sun Microsystems, Inc., of Santa Clara, Calif.). Those with ordinary skill in the art understand, however, that any number and type of computer systems may be utilized to provide one or more embodiments of the present invention, including those made by Hewlett Packard of Palo Alto, Calif., and International Business Machines (IBM)-compatible personal computers utilizing Intel microprocessors, which are available from several vendors (including IBM of Armonk, N.Y.).

Also, instead of a single processor 702, two or more processors (whether on a single chip or on separate chips) can be utilized to provide speedup in operations. It is further envisioned that the processor 702 may be a complex instruction set computer (CISC) microprocessor, a reduced instruction set computing (RISC) microprocessor, a very long instruction word (VLIW) microprocessor, a processor implementing a combination of instruction sets, and the like.

The network interface 718 provides the communication capability with a host or other computer systems (as described in previous paragraph) on a same local network, on a different network connected via modems and the like to the present network, or to other computers across the Internet. In various embodiments, the network interface 718 can be implemented utilizing technologies including, but not limited to, Ethernet, Fast Ethernet, Gigabit Ethernet (such as that covered by the Institute of Electrical and Electronics Engineers (IEEE) 701.1 standard), wide-area network (WAN), leased line (such as T1, T3, optical carrier 3 (OC3), and the like), analog modem, digital subscriber line (DSL) and its varieties such as high bit-rate DSL (HDSL), integrated services digital network DSL (IDSL), and the like, cellular, wireless networks (such as those implemented by utilizing the wireless application protocol (WAP)), time division multiplexing (TDM), universal serial bus (USB) and its varieties such as USB II, asynchronous transfer mode (ATM), satellite, cable modem, FireWire, and the like.

Moreover, the computer system 700 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 700 is a general purpose computer capable of running any number of applications such as those available from companies including Oracle, Siebel, Unisys, Microsoft, and the like.

Computer system 700 may also include a tape drive 800. Tape drive 800 may be coupled to I/O controller 706 via a Universal Serial Bus (USB). However, tape drive 800 may be coupled to I/O controller 706 via other types of peripheral interfaces.

Figure 8:
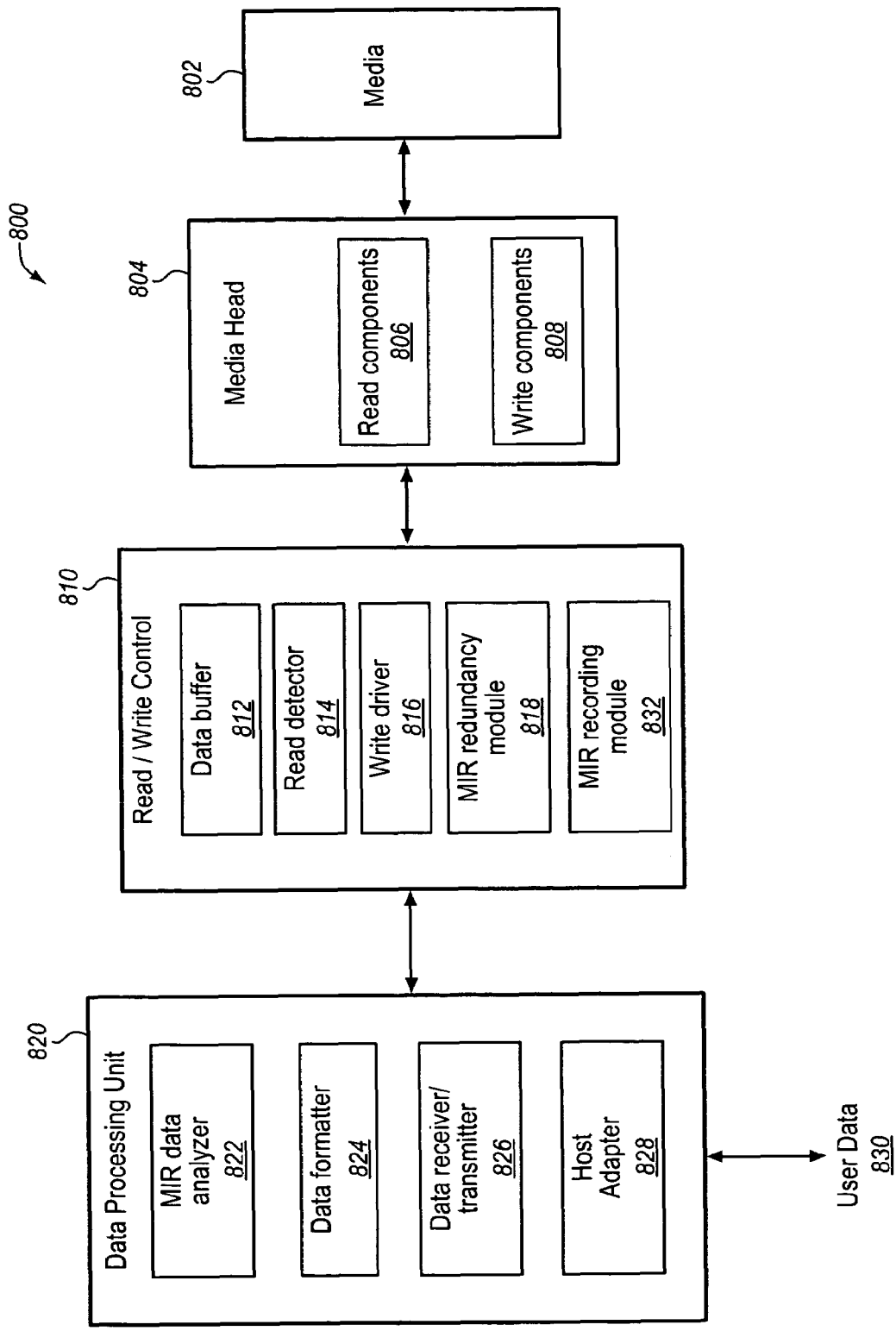
FIG. 8 illustrates one embodiment of a tape drive.

FIG. 8 illustrates one embodiment of a tape drive 800. Tape drive 800 includes a digital processing unit 820, read/write control 810, tape head 804, and media 802. Digital processing unit 820 receives user write data from I/O controller 706 that is forwarded for storage, and transmits received read data that is forwarded to I/O controller 706. Particularly, digital processing unit 820 includes a data receiver/transmitter 826 and host adapter 828. Host adapter 828 works with data receiver/transmitter 826 to receive user data 830 from a host and to forward data to a user as well as transmit data to read/write (R/W) control 810. Data processing unit 820 further includes a data formatter 824 to format and condition data for communication with users. Data processing unit 820 may further include a data compressor/decompressor to compress and decompress data when communicating the data with users. Furthermore, data processing unit 820 may also include a data encryptor/decryptor to encrypt and decrypt data when communicating the data with users.

Media 802 is a physical tape medium on which data is appended and stored. In one embodiment, media 802 is a magnetic tape. Media head 804 includes a tape head that is an electromagnetic component which reads and writes onto media 802 as media 802 passes over it. Media head 804 includes write components 808 and read components 806 to perform the write and read operations, respectively.

R/W control unit 810 controls the reading and writing of data at tape drive 800. R/W control 810 includes a read detector 814 to read data on media 802 and a write driver 816 to write data on media 802. Read detector 814, in communication with MIR data analyzer 822 at data processing unit 820, is further to read MIR information or data from data channels within the matrices of MIR. The read MIR information is then analyzed using data analyzer 822. Data analyzer 822 is further in communication with MIR rotating and redundancy module 818 and MIR recording module 832 at R/W control 810. In one embodiment, redundancy module is to provide rotating data channels within the matrices of MIR to provide redundant MIR information at subsequent matrices within a MIR region or area of media 802.

In one embodiment, MIR recording module 832 is to record redundant MIR data. Data buffer 812 is used to hold data including MIR information for any type or form of processing. It is contemplated that although various component, modules, and/or elements are shown as part of other components, such as data analyzer 822 at data processing unit 820 or redundancy and wrapping modules 818, 832 at R/W control unit 810, the placement of these components is flexible and even interchangeable. For example, data analyzer 822 may be placed at R/W control 810. Furthermore, these components are illustrated merely as an example for brevity and clarity and that the number and form of such components may vary as necessitated or desired.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Furthermore, embodiments of the present invention may be provided as computer program products, which may include an article of manufacture including a machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table). Additionally, the program produces may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
   identifying a default media information region (MIR) on a media, the default MIR having MIR information divided into segments;
   reading the MIR information;
   rotating the MIR information into a first rotation MIR information by rotating the segments by one segment;
   writing the first rotation MIR information into a first MIR on the media;
   reading the first rotation MIR information;
   rotating the first rotation MIR information into a second rotation MIR information by rotating the segments by one segment; and
   writing the second rotation MIR information into a second MIR on the media.

2. The method of claim 1, wherein the default MIR and the first MIR are located in a MIR area on the media, the media including a magnetic tape.

3. The method of claim 1, wherein the second MIR is located in the MIR area on the media.

4. The method of claim 1, further comprising:
   reading the second rotation MIR information;
   rotating the second rotation MIR information into an Nth rotation MIR information by rotating the segments by one segment, wherein N equals at least the number of MIR segments; and
   writing the Nth rotation MIR information into an Nth MIR in the MIR area on the media.

5. The method of claim 1, wherein reading continues until the MIR information from each segment is read.

6. The method of claim 1, wherein rotating continues until each segment is rotated, wherein each segment includes a data channel.

7. The method of claim 1, wherein writing continues until writing of the MIR information is completed into subsequent MIRs ending with the Nth MIR, wherein N equals at least the number of MIR segments.

8. A method comprising:
   identifying a default media information region (MIR) at a default location on a media, the default MIR having default MIR information;

generating a first MIR, the first MIR having the default MIR information and first MIR information;

placing the first MIR at a first location on the media;

generating a second MIR, the second MIR having the default MIR information, the first MIR information, and second MIR information; and placing the second MIR at a second location on the media.

9. The method of claim 8, wherein the first MIR information comprises subsequent MIR information gathered on the media since the default MIR was generated, the media including a magnetic tape.

10. An apparatus comprising:

a data processing unit to identify a default media information region (MIR) on a media, the default MIR having MIR information divided into segments; and a control unit coupled with the data processing unit, the control unit to read the MIR information, rotate the MIR information into a first rotation MIR information by rotating the segments by one segment, write the first rotation MIR information into a first MIR on the media; read the first rotation MIR information; rotate the first rotation MIR information into a second rotation MIR information by rotating the segments by one segment; and write the second rotation MIR information into a second MIR on the media.

11. The apparatus of claim 10, wherein the default MIR and the first MIR are located in a MIR area on the media, the media including a magnetic tape.

12. A system comprising:

a tape drive coupled to a computer system, the tape drive to communicate data with a user via the computer system, the tape drive is further to:

identify a default media information region (MIR) on a media, the default MIR having MIR information divided into segments;

read the MIR information;

rotate the MIR information into a first rotation MIR information by rotating the segments by one segment;

write the first rotation MIR information into a first MIR on the media;

read the first rotation MIR information;

rotate the first rotation MIR information into a second rotation MIR information by rotating the segments by one segment; and write the second rotation MIR information into a second MIR on the media.

13. The system of claim 12, wherein the default MIR and the first MIR are located in a MIR area on the media, the media including a magnetic tape.

14. An article of manufacture comprising a machine-readable media having instructions which when executed, cause a machine to:

identify a default media information region (MIR) on a media, the default MIR having MIR information divided into segments;

read the MIR information;

rotate the MIR information into a first rotation MIR information by rotating the segments by one segment;

write the first rotation MIR information into a first MIR on the media;

read the first rotation MIR information;

rotate the first rotation MIR information into a second rotation MIR information by rotating the segments by one segment; and write the second rotation MIR information into a second MIR on the media.

15. The article of manufacture of claim 14, wherein the default MIR and the first MIR are located in a MIR area on the media, the media including a magnetic tape.

* * * * *